United States Patent
Biagetti et al.

(10) Patent No.: US 7,354,874 B2
(45) Date of Patent: Apr. 8, 2008

(54) VARIABLE EXHAUST STATIC PRESSURE MANAGEMENT APPARATUS

(75) Inventors: Michael R. Biagetti, Fishkill, NY (US); Charles J. Taft, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 362 days.

(21) Appl. No.: 11/162,810

(22) Filed: Sep. 23, 2005

(65) Prior Publication Data

US 2007/0071655 A1    Mar. 29, 2007

(51) Int. Cl.
*H01L 21/00*    (2006.01)
*B01D 53/38*    (2006.01)
*B01J 19/00*    (2006.01)

(52) U.S. Cl. .................. 438/800; 438/935; 423/210; 422/168

(58) Field of Classification Search ............. 423/210; 422/168; 438/800, 935
See application file for complete search history.

(56) References Cited

U.S. PATENT DOCUMENTS

| 4,276,871 | A | | 7/1981 | Lindtveit |
| 6,109,915 | A | * | 8/2000 | Liu et al. ............ 432/253 |
| 7,108,009 | B2 | * | 9/2006 | Ishida ............ 137/487.5 |

* cited by examiner

*Primary Examiner*—Timothy C. Vanoy
(74) *Attorney, Agent, or Firm*—Lisa U. Jaklitsch

(57) ABSTRACT

The present invention is directed to a semiconductor apparatus that enables in situ wet processing of semiconductor wafers, and prevents creation of a static pressure within the in situ wet processing system. The apparatus comprises multiple exhaust receptacles. Each exhaust receptacle is operable in an open and closed position and receives an associated toxic wet processing byproduct only in the open position. An exhaust is connected to each exhaust receptacle and suctions the contents of said exhaust receptacle in both the open and closed positions. An intake is connected to said exhaust receptacle only when the exhaust receptacle is in a closed position. The intake introduces a gas chemically compatible to the toxic wet processing byproduct associated with the exhaust receptacle. The exhaust releases the toxic wet processing byproduct and the chemically compatible gas to the same waste stream at the semiconductor factory.

12 Claims, 2 Drawing Sheets

US 7,354,874 B2

VARIABLE EXHAUST STATIC PRESSURE MANAGEMENT APPARATUS

FIELD OF THE INVENTION

This invention relates generally to semiconductor manufacturing and more particularly to an exhaust apparatus used in conjunction with a wet processing system for use in semiconductor manufacturing.

DESCRIPTION OF THE RELATED ART

In semiconductor manufacturing, various wet processes are used to create semiconductor wafers. Wet processing refers to a process that is used for surface preparation of semiconductor wafers. Surface preparation has been commonly known as clean, etch and/or strip through immersion of wafers in appropriate chemical solutions where the cleaning or etching occurs. Semiconductor processes that build devices involve many process steps, various processing environments, and equipment beyond just wet processing tools. Often debris can be left on the semiconductor wafer from one semiconductor manufacturing process that must be removed prior to a subsequent semiconductor manufacturing process. Wet processing removes such debris. Sometimes a masking film must be removed that was necessary for one semiconductor manufacturing process but that is not necessary in a subsequent semiconductor manufacturing process. Wet processing removes such masking film. While wet processing is beneficial for the surface preparation of semiconductor wafers, wet processing creates toxic byproducts that must be exhausted for the well-being of both the wet processing equipment and those operating the wet processing equipment.

In the past, wet processing occurred serially. In other words, if a semiconductor wafer required wet processing with an acid solution followed by wet processing with a basic solution, the wafer would be transferred physically from an acid wet processing system to a basic wet processing system. Each wet processing system had a dedicated exhaust for the toxic byproducts. The dedicated exhaust operated to eliminate the toxic byproducts whenever the wet processing system was utilized and suctioned any toxic byproducts into the appropriate waste stream of the factory. Toxic byproducts must be treated according to their chemical compositions. Therefore, an acid wet processing byproduct must be exhausted to the acid waste stream of the factory and a base wet processing byproduct must be exhausted to a base waste stream of the factory.

Currently, wet processing occurs in situ. In other words, if a semiconductor wafer requires wet processing with an acid solution followed by wet processing with a basic solution, the wafer remains in one wet process tank that conducts all required wet processing steps. A single wet process tank contains the required base and acid solutions, which are introduced into a multi injection bath. Rinse steps separate base from acid wet processing steps. An in situ wet processing system comprises multiple wet process tanks. At any given time, an acidic or base wet process could occur in any one of the multiple wet process tanks. Therefore, at any given time, a dedicated exhaust must be ready to suction the byproducts of the associated acid or base wet process occurring in the wet process tank. Therefore, in an in situ wet processing system, the dedicated exhausts constantly suction in the event that at any given time one of the wet process tanks is performing an acid or base wet process on a semiconductor wafer. A slider plate over an exhaust receptacle associated with a dedicated exhaust prevents byproducts that are not associated with the exhaust from entry into the dedicated exhaust. In so doing, the slider plate prevents toxic byproducts with incompatible chemistries from entering the wrong waste stream at the factory.

FIG. 2 depicts the in situ wet processing system 200 currently used in semiconductor manufacturing. Two wet process tanks 210a, 210b are shown. Each wet process tank comprises all necessary solutions for various wet processing. Some such solutions include, but are not limited to, acid, base, general, and solvent solutions. Wafers are deposited into the wet process tanks 210a, 210b and all necessary wet processing occurs inside. As shown in FIG. 2, the in situ wet processing system 200 is connected to an acid and base exhaust 250a,b. Toxic base byproducts from a base wet process conducted in wet process tank 210a are exhausted from wet process tank 210a through trunk 220 and directed through exhaust access point 230 to basic exhaust receptacle 240b and finally into the basic exhaust 250b. Similarly, toxic acid byproducts from an acidic wet process conducted in wet process tank 210a are exhausted from wet process tank 210a through trunk 220 and directed through exhaust access point 230 to acid exhaust receptacle 240a and into acid exhaust 250a. The wet process tanks 210a,b share access to the acid and base exhaust receptacles 240a,b through use of a slider plate (not shown) within exhaust access point 230. The slider plate covers the exhaust receptacle not presently in use. In so doing, the slider plate prevents toxic byproducts from entering an incompatible waste stream at the factory. For example, while a semiconductor wafer undergoes an acidic wet process, the slider plate covers the basic exhaust receptacle 240b, which prevents acid byproducts from entering the base waste stream at the factory. Similarly, while the semiconductor wafer undergoes a base wet process, the slider plate covers the acid exhaust receptacle 240a, which prevents base waste products from entering the acid waste stream at the factory.

A static pressure event is caused by the slider plate that covers the exhaust receptacle not presently in use. The base and acid exhausts 250a, 250b constantly suction toxic byproducts for all the wet process tanks 210a,b connected to them. For example, the basic and acid exhausts 250a, 250b suction the contents of the exhaust receptacles 240a, 240b. While wet process tank 210a may be undergoing a basic wet process, and therefore would not need access to the acid exhaust 250a, wet process tank 210b may be undergoing an acid wet process, and therefore would need access to the base exhaust 250b. Therefore, the base and acid exhausts 250a,b must constantly suction in the event that at any given time one of the wet process tanks 210a,b require removal of the toxic byproduct associated with the exhaust. When the slider plate covers the exhaust receptacle not used, a static pressure event is created because the exhaust dedicated to the exhaust receptacle no longer has a toxic byproduct to suction from the exhaust receptacle. A similar phenomena occurs when a large object covers the intake of a vacuum cleaner. To eliminate the static pressure in the vacuum cleaner, the large object must be removed. To eliminate the static pressure in an situ wet processing system, the slider plate must be removed. However, removal of the slider plate is not feasible because the toxic byproducts from the undergoing process in a wet process tank would then be routed to all the exhausts connected to trunk 220 and exhaust access point 230. Toxic byproducts must be specially treated according to their chemical compositions. Therefore, it is necessary that only acid toxic byproducts are exhausted to the acid exhaust and base toxic byproducts are exhausted to the base exhaust. Accordingly, the slider plate is necessary in an in situ wet processing system.

In situ processing, saves time because the semiconductor wafer must not be transferred amongst the wet processing systems. In addition, in situ processing reduces the risk of damage to the semiconductor wafer because the semiconductor wafer remains in one position. Finally, in situ processing reduces time to market because each wet processing system performs each wet process, and therefore, multiple semiconductor wafers undergo wet processing at the same time. The disadvantage of in situ processing is the creation of static pressure variations.

Static pressure variations can cause incompatible chemistries to encounter vapor mixing which is a dangerous byproduct of the use of various wet processing solutions. An excessive buildup of vapor mixing forming "salts," such as ammonia sulfates, ammonia fluorides, or ammonia chlorides, can cause wet processing equipment to malfunction. In addition, an excessive buildup of "salts" can endanger the employees working in the semiconductor factory. Currently, static pressure is monitored for deviation from a predetermined acceptable threshold. Upon deviation from that predetermined acceptable threshold, the wet processing system is shut down and the static pressure reduced to below the predetermined acceptable threshold.

What is needed in the art is an improved wet processing system that eliminates static pressure, while enabling in situ wet processing.

BRIEF SUMMARY OF THE INVENTION

The present invention is directed to a semiconductor wet processing exhaust apparatus. The apparatus comprises wet processing exhaust receptacles, an exhaust, and an intake. Each wet processing exhaust receptacle, which is operable in an open and closed position, is associated with a wet processing byproduct. The exhaust receptacles receive the associated wet processing byproduct only in the open position. An exhaust is also associated with a wet processing byproduct and connected to the exhaust receptacle also associated with this wet processing byproduct. The exhaust suctions the contents of the exhaust receptacle in the open and closed positions. The intake is connected to the exhaust receptacle only in the closed position. The intake enables introduction of a gas chemically compatible with the wet processing byproduct associated with the exhaust receptacle.

The present invention is directed to a method for exhausting wet process byproducts. The method comprises two receiving steps and a releasing step. One receiving step comprises receiving a wet processing byproduct from a wet processing tank in an exhaust receptacle within a plurality of exhaust receptacles within the wet processing apparatus. The exhaust receptacle is associated with the received wet processing byproduct and is operable between an open and a closed position. The byproduct receiving step occurs only with the exhaust receptacle in the open position. Another receiving step comprises receiving a gas chemically compatible with the received wet processing byproduct in the exhaust receptacle. The gas receiving step occurs only with the exhaust receptacle in a closed position. The releasing step comprises releasing the contents of the exhaust receptacle. The releasing step occurs with the exhaust receptacle in both the open and closed positions.

The present invention eliminates static pressure in an in situ wet processing system.

For at least the foregoing reason, the invention improves upon semiconductor manufacturing.

BRIEF DESCRIPTION OF THE DRAWINGS

The features and the element characteristics of the invention are set forth with particularity in the appended claims. The figures are for illustrative purposes only and are not drawn to scale. Furthermore, like numbers represent like features in the drawings. The invention itself, however, both as to organization and method of operation, may best be understood by reference to the detailed description which follows, taken in conjunction with the accompanying figures, in which:

DETAILED DESCRIPTION OF THE INVENTION

The invention will now be described with reference to the accompanying figures. In the figures, various aspects of the structures have been shown and schematically represented in a simplified manner to more clearly describe and illustrate the invention.

By way of overview and explanation, the invention eliminate static pressure in an in situ wet processing system. Each wet process tank conducts various wet processes on multiple semiconductor wafers. In order to properly treat toxic byproducts created by such wet processes, toxic byproducts must be directed to the appropriate exhaust in the semiconductor factory. In today's wet processing system, a slider plate ensures that toxic byproducts only enter the appropriate waste stream of the factory. When a particular exhaust is not required by the undergoing wet process, a slider plate covers the unnecessary exhaust receptacle. In so doing, the slider plate prevents toxic byproducts from entering the wrong waste stream at the factory. While the exhaust receptacle may be covered, the exhaust connected to the exhaust receptacle continues to suction. The exhaust, however, does not suction any toxic byproducts for as long as the slider plate covers the exhaust receptacle. In so doing, by covering the exhaust receptacle with a slider plate, a static pressure event is created in the wet processing system.

Figure 1:
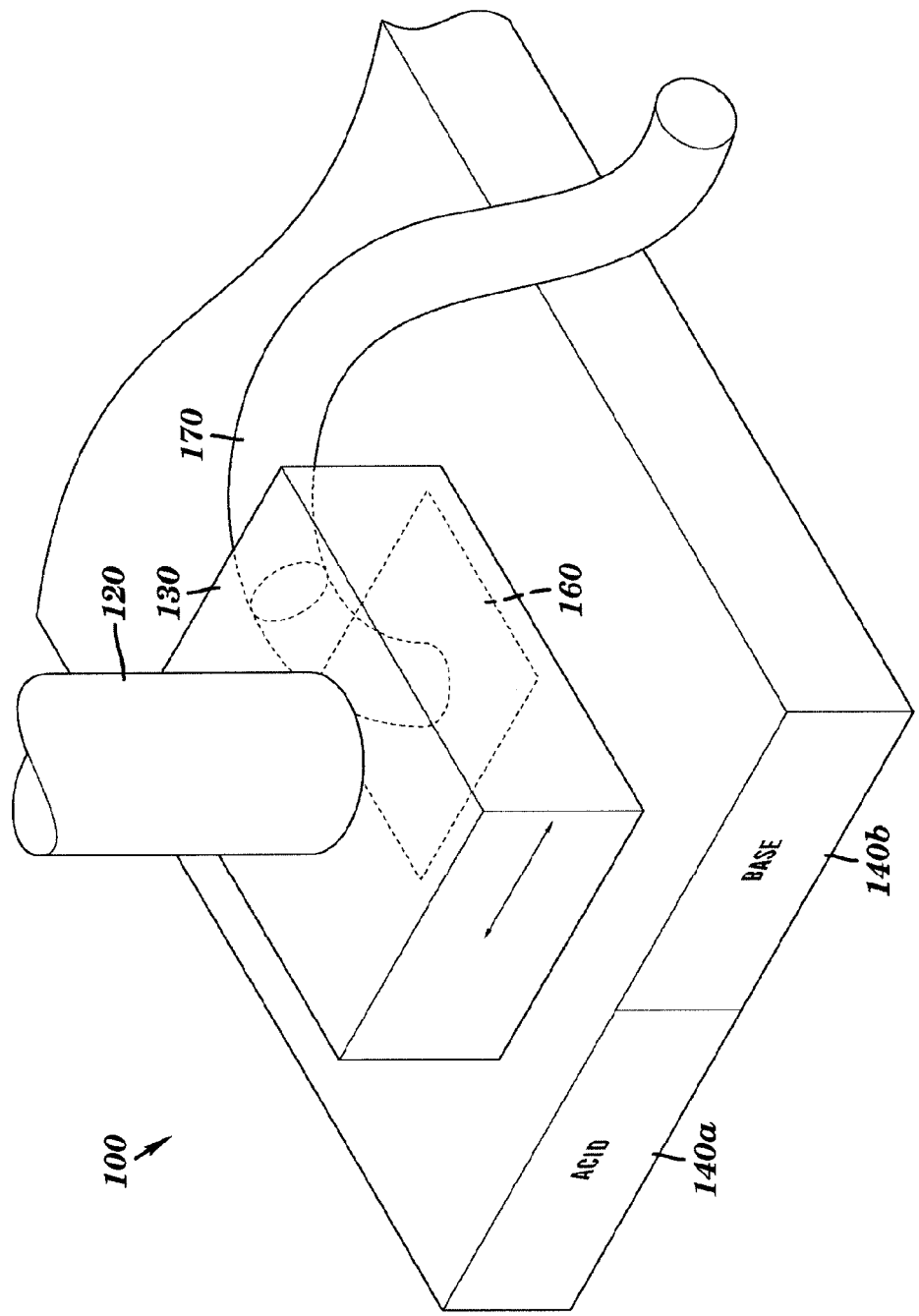
FIG. 1 depicts an in situ wet processing system in accordance with the claimed invention; and, FIG. 2 depicts an in situ wet processing system in accordance with the prior art.
Figure 2:
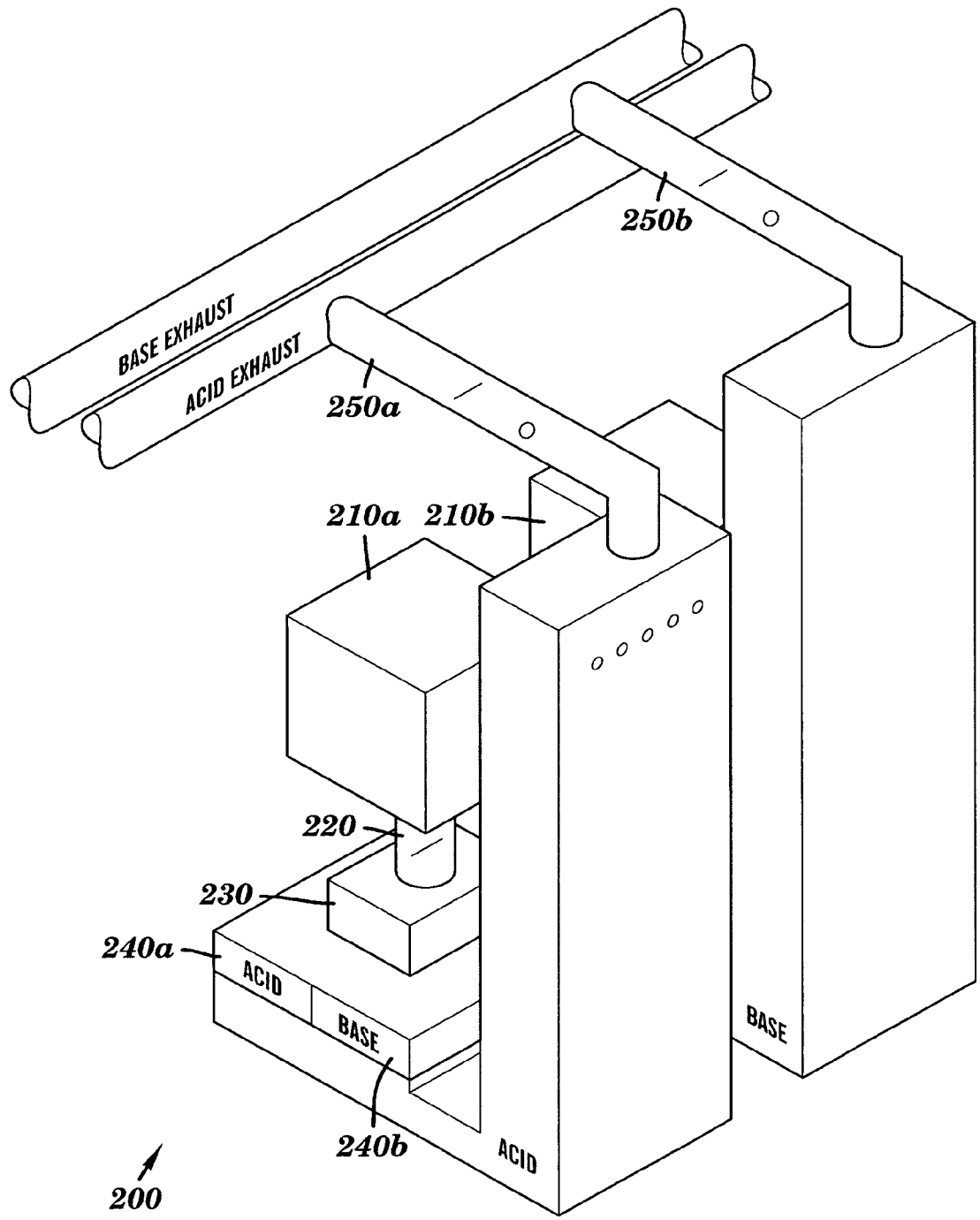

FIG. 1 depicts an apparatus in accordance with an embodiment of the invention that eliminates the static pressure. The apparatus comprises a trunk 120 connected to a wet process tank (not shown) and an exhaust access point 130. The slider plate 160 in FIG. 1 covers the base exhaust receptacle 140b. Therefore, one can deduce that an acid wet process is currently being conducted in the wet process tank. Unlike prior in situ wet processing systems, the invention attaches a shunt draft 170 to the slider plate. The shunt draft 170 prevents creation of a static pressure event. As mentioned herein above, the exhaust continues to suction even when covered by the slider plate 160. When the slider plate 160 covers the exhaust receptacle, there are no toxic byproducts for the exhaust to suction, which in the past created a static pressure event. With the present invention, however, a shunt draft 170 is connected to ambient air outside of the semiconductor equipment. Therefore, when the basic exhaust is not necessary, when for instance an acid wet process is being conducted, instead of toxic byproducts, the exhaust suctions air outside of the semiconductor equipment into the basic waste stream at the factory. Ambient air is chemically compatible with both acid and base chemical compositions. In so doing, the invention prevents creation of the static pressure event, but still enables in situ wet processing.

While the invention has been particularly described in conjunction with a specific preferred embodiment and other alternative embodiments, it is evident that numerous alternatives, modifications and variations will be apparent to those skilled in the art in light of the foregoing description. It is therefore intended that the appended claims embrace all such alternatives, modifications and variations as falling within the true scope and spirit of the invention.

What is claimed is:

1. A semiconductor wet processing exhaust apparatus, comprising:
    a plurality of wet processing exhaust receptacles, each receptacle associated with a wet processing byproduct, each exhaust receptacle operable in an open and closed position, said exhaust receptacle receiving said associated wet processing byproduct only in said open position;
    an exhaust associated with a wet processing byproduct and connected to an exhaust receptacle also associated with said wet processing byproduct, said exhaust suctioning contents of said exhaust receptacle in said open and closed positions; and,
    an intake connected to said exhaust receptacle only in said closed position, said intake enabling introduction of a gas chemically compatible with said wet processing byproduct associated with said exhaust receptacle.

2. A apparatus as in claim 1, further comprising:
    a wet processing tank connected to said plurality of wet processing receptacles that releases a wet processing byproduct into said exhaust receptacle associated with said wet processing byproduct, when said exhaust receptacle is in said open position.

3. An apparatus as in claim 2, further comprising:
    one wet processing exhaust receptacle receiving a wet processing byproduct for an acidic solution, and another wet processing exhaust receptacle receiving a wet processing byproduct for a basic solution.

4. An apparatus as in claim 3, only one wet processing exhaust receptacle in said plurality is in said open position at a given time, while said remaining wet processing receptacles are in said closed position at such time.

5. An apparatus as in claim 4, said intake comprises:
    a slider plate that slideably connects to said wet processing exhaust receptacle in said closed position; and,
    a shunt draft connected to said slider plate that enables introduction of said chemically compatible gas outside of said apparatus into said shunt draft and said exhaust.

6. An apparatus as in claim 5, said exhaust releasing said wet processing byproduct into a semiconductor manufacturing waste stream associated with said wet processing byproduct.

7. An apparatus as in claim 6, said chemically compatible gas comprising air.

8. A method for exhausting wet process byproducts, comprising:
    receiving a wet processing byproduct from a wet processing tank in an exhaust receptacle within a plurality of exhaust receptacles of a wet processing apparatus, said exhaust receptacle associated with said received wet processing byproduct and operable between an open and a closed position, said byproduct receiving step occurring only with said exhaust receptacle in said open position;
    receiving a gas chemically compatible with said received wet processing byproduct in said exhaust receptacle, said gas receiving step occurring only with said exhaust receptacle in said closed position; and,
    releasing contents of said exhaust receptacle, said releasing step occurring with said exhaust receptacle in both said open and closed positions.

9. A method as in claim 8, said wet processing byproduct is one of a basic wet processing byproduct and acid wet processing byproduct.

10. A method as in claim 8, said exhaust receptacle is one of an acid exhaust receptacle and a basic exhaust receptacle.

11. A method as in claim 8, said gas chemically compatible with said wet processing byproduct comprising air.

12. A method as in claim 8, said contents are released into a semiconductor manufacturing waste stream associated with said wet processing byproduct.

* * * * *